United States Patent [19]

Puckette

[11] Patent Number: 4,475,219
[45] Date of Patent: Oct. 2, 1984

[54] DEMODULATOR FOR FREQUENCY-SHIFT-KEYED BINARY DATA SIGNALS

[75] Inventor: Charles M. Puckette, Scotia, N.Y.

[73] Assignee: General Electric Company, Schenectady, N.Y.

[21] Appl. No.: 409,237

[22] Filed: Aug. 18, 1982

[51] Int. Cl.³ .................................... H04L 27/14
[52] U.S. Cl. ..................................... 375/82; 371/57; 375/88
[58] Field of Search ................ 375/88, 82, 80, 45, 375/9, 3, 1, 39, 120, 91; 371/57, 59, 60, 61, 63, 68; 329/107, 110, 112, 126; 307/510, 522, 524

[56] References Cited

U.S. PATENT DOCUMENTS

3,289,082 11/1966 Shumate .................................. 375/39
4,246,654 1/1981 Malm ....................................... 375/82
4,254,503 3/1981 Vance .................................. 375/88 X
4,376,309 3/1983 Fenderson et al. ............. 375/120 X

*Primary Examiner*—Benedict V. Safourek
*Attorney, Agent, or Firm*—Geoffrey H. Krauss; James C. Davis, Jr.; Marvin Snyder

[57] ABSTRACT

A frequency-shift-keyed binary data signal demodulator utilizes a reference frequency equal to the arithmetic mean of the two tone frequencies corresponding to the two binary states of an FSK data signal. The frequency-acceptance bands of the FSK signals are varied by variation of the reference frequency. An auxiliary "data valid" signal can be recovered along with the recovered binary data. A demodulator is also disclosed for providing maximum likelihood of detection of an FSK signal having a frequency shift which is a multiple of the bit rate.

25 Claims, 15 Drawing Figures

DEMODULATOR FOR FREQUENCY-SHIFT-KEYED BINARY DATA SIGNALS

BACKGROUND OF THE INVENTION

The present invention is directed to data signal demodulators and, more particularly, to novel frequency-shift-keyed data demodulators having an easily varied operating frequency range.

Digital data is commonly sent over a communications channel by shifting the frequency of a transmitted communications signal between discrete values representing the digital information. For binary digital data, the carrier frequency is typically shifted to a higher frequency for transmitting a first binary value and to a lower frequency for transmitting the remaining binary value. A data receiver receives the frequency-shift-keyed (FSK) carrier and decides whether the higher or lower frequency is being received, to provide a data output having the first or second binary value. While many FSK demodulator circuits are known to the prior art, not all of these circuits are capable of being monolithically integrated into a single, low cost integrated circuit component. In many integratable FSK demodulators, it is difficult, if not impossible, to shift the demodulator operating frequency band; it is, however, highly desirable to be able to shift this operating frequency band by merely changing a reference frequency. The ability to shift the operating frequency band by changing a reference frequency is particularly desirable for use in a data receiver in a frequency-hopped spread spectrum data transmission system.

BRIEF SUMMARY OF THE INVENTION

In accordance with the invention, a demodulator for frequency-shift-keyed data signals comprises means for providing first and second local reference signals, in phase-quadrature to one another; each of the local reference signals is coupled to an associated one of a pair of signal mixing means, each receiving the FSK signal to be demodulated. The difference output of each mixing means is selected by a lowpass filter and is amplitude limited. The I and Q signals thus derived are respectively coupled to the data and clock inputs of a bistable logic element, at the output of which is provided the recovered binary digital data, if the local reference signal is of a frequency substantially equal to the arithmetic mean between the tone frequencies assigned to the binary data values.

In one presently preferred embodiment, the validity of the data output of the bistable element can be indicated by data-valid circuitry using an exlusive-OR gate and a multivibrator. A change of data output can be prevented when invalid data is present. Detection of the most likely one of the two data states can also be provided, when the frequency shift used is a multiple of the data bit rate.

Accordingly, it is an object of the present invention to provide novel frequency-shift-keyed binary data demodulators.

This and other objects of the present invention will become apparent upon consideration of the following detailed description, when read in conjunction with the drawings.

DETAILED DESCRIPTION OF THE INVENTION

Referring initially to FIGS. 1 and 1a–1c, a frequency-shift-keyed binary data demodulator 10 receives a frequency-shift-keyed (FSK) signal at input 10a thereof. The input FSK signal is coupled in parallel to a first port 11a and 12a of each of a pair of mixers 11 and 12. A local oscillator port 11b or 12b of each of the mixers receives a local reference oscillator signal, at local oscillator frequency $f_0$. The local oscillator signals are in phase quadrature, such that there is a 90° phase shift therebetween. Thus, first mixer 11 receives a local reference oscillator signal of $\cos 2\pi f_0 t$, and second mixer 12 receives a local reference oscillator signal of $\sin 2\pi f_0 t$. Each mixer output port 11c or 12c is coupled through one of associated lowpass filter and limiter means 15 or 16 to provide a first I signal or a second Q signal thereat. The lowpass filter means selects the base-band (difference) mixer output product for each of the I and Q signals. The limited I signal is supplied to the data D input of a type D flip-flop logic element 18, while the limited Q signal is applied to the clock C input thereof. The demodulated FSK binary data is provided by the Q output of flip-flop 18 to the demodulator circuit output 10a.

I have found that the relative phasing of the I and Q channels in a coherent base-band system demodulator reverses when the input signal frequency transitions from above the mixer reference frequency to below the mixer reference frequency. Thus, if the reference local oscillator frequency $f_0$ is substantially equal to the arithmetic mean of the tone frequencies utilized for the two binary FSK signals, then the relative phase between the I and Q channels provides the information required to correctly recover the transmitted FSK binary data.

Figure 1:
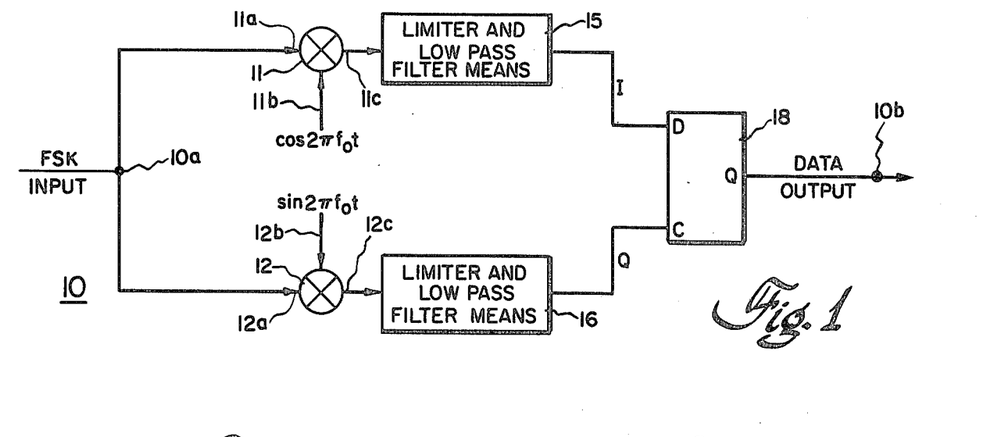
FIG. 1 is a schematic block diagram of a basic embodiment of the FSK demodulator of the present invention.
Figure 1A:
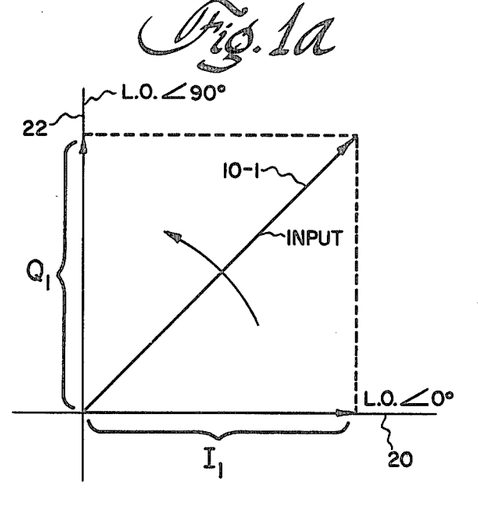
FIGS. 1a and 1b are vector diagrams relating the I and Q channel outputs of the demodulator for the cases wherein the input signal frequency is respectively greater than and less than the local reference oscillator frequency.
Figure 1B:
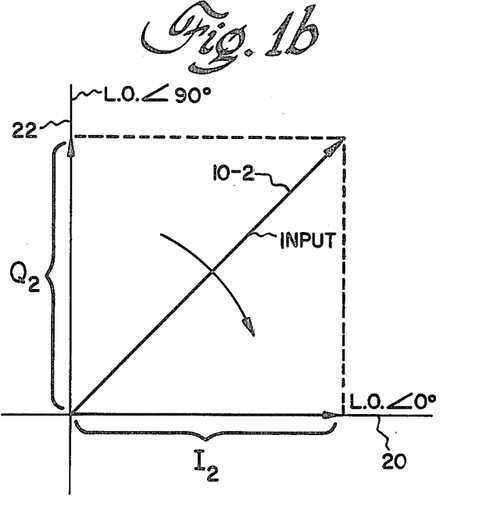
Figure 1C:
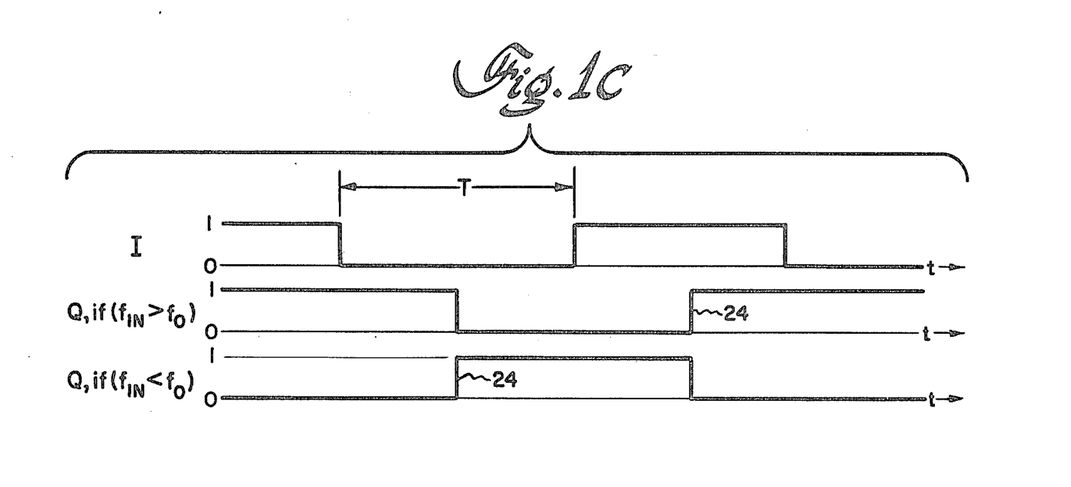
FIG. 1c is a set of interrelated timing diagrams useful in understanding the operation of the demodulator.

In FIGS. 1a and 1b, the cosinusoidal oscillator wavefore, i.e. the local oscillator waveform at an angle of 0° (L.O.∠0°) at mixer input 11b forms the horizontal axis 20, and the sinusoidal local oscillator waveform i.e. the local oscillator waveform at an angle of 90° (L.O.∠90°) at mixer input 12b forms the vertical axis 22. The input vector 10-1 will rotate counter-clockwise, with respect to the zero angle axis 20, if the input frequency is greater than the local oscillator reference frequency (FIG. 1a); the Q channel output amplitude $Q_1$ will begin going positive only after the I channel output $I_1$ reaches its positive peak (when input vector 10-1 lies along zero angle axis 20). Conversely, for an input frequency less than the local oscillator reference frequency (FIG. 1b) the input vector 10-2 rotates in a counterclockwise direction and the Q channel output $Q_2$ will begin going negative after the I channel output $I_2$ reaches its output peak. Since, at any instant of time the FSK waveform can only be at one of two frequencies, i.e. above or below the reference frequency $f_0$ when frequency $f_0$ is chosen to lie between the keyed frequencies representing the binary values, by centering the local reference frequency between the two FSK frequencies, the input FSK frequency will be either D Hz. above or below the reference frequency $f_0$. Therefore, the Q channel low-to-high waveform transition 24 (FIG. 1c) occurs while the I channel waveform is high if the input FSK frequency $f_{IN}$ is greater than the local reference frequency $f_0$, and occurs while the I channel waveform is at a low (logic 0) level if the input FSK frequency $f_{IN}$ is less than the local reference frequency $f_0$. The Q channel signal is therefore used as a clock waveform for the type-D flip-flop 18, which stores the data of the I channel signal at its D input, responsive to a rising edge transition 24 at the clock C input thereof. Thus, if the input frequency $f_{IN}$ is greater than the local reference frequency $f_0$, the I signal will be at a logic 1 level when the rising edge 24 of the Q signal appears at the flip-flop clock, resulting in a Q data output logic 1 level, signifying the first binary condition; the I signal will be at a low logic 0 level when the clock input responds to rising edge 24 to provide a Q data output logic 1 level, corresponding to the second binary condition. The binary state of the FSK input signal is thus recovered and provided at output 10b.

Figure 2:
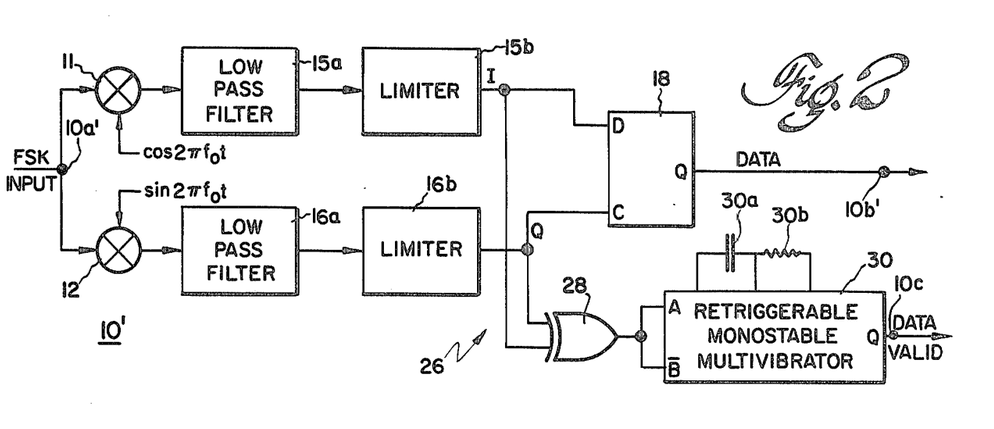
FIG. 2 is a schematic block diagram of a first presently preferred FSK demodulator having a "valid data" output.
Figure 2A:
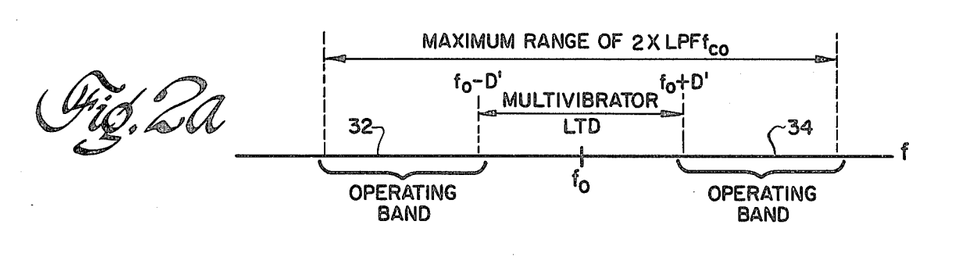
FIG. 2a is a graph illustrating the operating frequency shift limitations of the demodulator of FIG. 2.

Referring now to FIGS. 2 and 2a, an improved performance circuit 10' provides a binary data output signal at data output 10b' and a "data-valid" signal at an auxiliary circuit output 10c', responsive to the frequency-shift-keyed signal at input 10a'. In addition to the first and second mixer means 11 and 12 receiving local reference signals in phase quadrature and providing the mixing products thereof through an associated lowpass filter means 15a or 16a and an associated limiter means 15b and 16b, respectively, to the data D input and clock C input of a flip-flop 18, circuit 10' uses an additional logic subcircuit 26 to detect the occurrence of "zero crossings", i.e. level transitions at the outputs of limiters 15b and 16b, at a prescribed rate. Logic subcircuit 26 includes an exclusive-OR gate 28 having each of its two inputs connected to a different one of the I and Q signal outputs of respective limiters 15b and 16b. The output of the exclusive-OR gate 28 is coupled to both the positive-triggering A input and negative-triggering $\bar{B}$ input of a retriggerable monostable multivibrator 30. The duration of the multi-vibrator output pulse is established by associated timing capacitance 30a and timing resistance 30b. The data-valid signal at circuit output 10c' is obtained at the Q output of multivibrator 30.

The output of gate 28 is at a high (logic 1) level whenever the I and Q signals are at different levels, and is at a low (logic 0) level whenever the I and Q signals are at the same binary logic level. By reference to the waveforms of FIG. 1c, it may be observed that the output of the gate 28 will be a square wave at a frequency substantially equal to twice the frequency of the difference between the local reference frequency $f_0$ and either of the FSK binary data frequencies, when the local reference frequency $f_0$ is at the arithmetic mean of the two binary data FSK frequencies. The low-to-high transition of the gate 28 output waveform triggers the positive-going A input of the multivibrator 30, while the high-to-low gate output transition triggers the negative-going $\bar{B}$ input, whereby a pulse of some predetermined duration (related to the values of capacitance 30a and resistance 30b) appears at the data valid output 10c' for any transition of the gate 28 output signal. In operation, the duration of the monostable multivibrator 30 output pulse is set so as to define the lowest shift frequency D' of interest. Thus, when the two binary input frequencies are defined as $f_0+D$ and $f_0-D$, the lowest frequency of interest D' provides an upper limit to the lower shift frequency operating band 32 (FIG. 2a) and a lower frequency limit to the upper operating operating band 34. The maximum shift frequency, i.e. the maximum value of D, is established by the maximum range of twice the cutoff frequency $f_{co}$ of lowpass filters 15a and 16a, i.e. the lowpass filter cutoff frequency establishes the maximum frequency deviation D, from the local reference frequency $f_0$, which can be recognized by the circuit. For frequencies within operating bands 32 and 34, the output pulses of multivibrator 30 are sufficiently long such that the multivibrator is retriggered to provide a next output pulse before the previous output pulse is completed. In other words, if the value of D is high enough, the one-shot multivibrator never times out and a valid (logic 1) level is present at output 10c. If an input signal is not present, or if the frequency-shift value D is too low, the multivibrator will time out between triggers and the Q output thereof will fall to a logic 0 level, indicating that invalid data is then present at data output 10b'. Thus, the frequency range constraints on the input signal are imposed by the lowpass filters 15a and 16a on the one hand (maximum frequency limits) and by the multivibrator timing components 30a and 30b (minimum frequency limits) on the other.

The detector circuit 10' of FIG. 2 provides a pulsating data valid signal at output 10c'; this pulsating data valid signal may be objectionable. Utilizing the subcircuit 26' of FIG. 2b, the pulsating data valid signal is converted into a constant data valid logic level. In addition to exclusive-OR gate 28 and retriggerable monostable multivibrator 30, logic subcircuit 26' utilizes a pair of D-type flip-flop logic elements 32 and 34. The clock C inputs of flip-flops 32 and 34 are connected to the Q signal line and the reset R inputs are connected to the $\bar{Q}$ output of multivibrator 30. The data D input of flip-flop 32 receives a positive logic voltage +V, while the D input of flip-flop 34 is connected to the Q output of flip-flop 32. The data valid signal for output 10c' is obtained from the Q output of flip-flop 34. Flip-flops 32 and 34 form a two-stage serial shift register clocked by the Q channel output and cleared by the output of multivibrator 30. With the data D input of flip-flop 32 hardwired to a logic 1 level (as provided by voltage +V), two successive positive-going Q channel transitions must occur, before the monostable multivibrator times out, to cause a data valid (logic 1) level to appear at the shift register output 10c' and indicate that valid data is present. Conversely, if invalid data is present, the pulsating signal at the multivibrator $\bar{Q}$ output will reset the shift register and provide a data-invalid (logic 0) level at output 10c'.

Figure 2B:
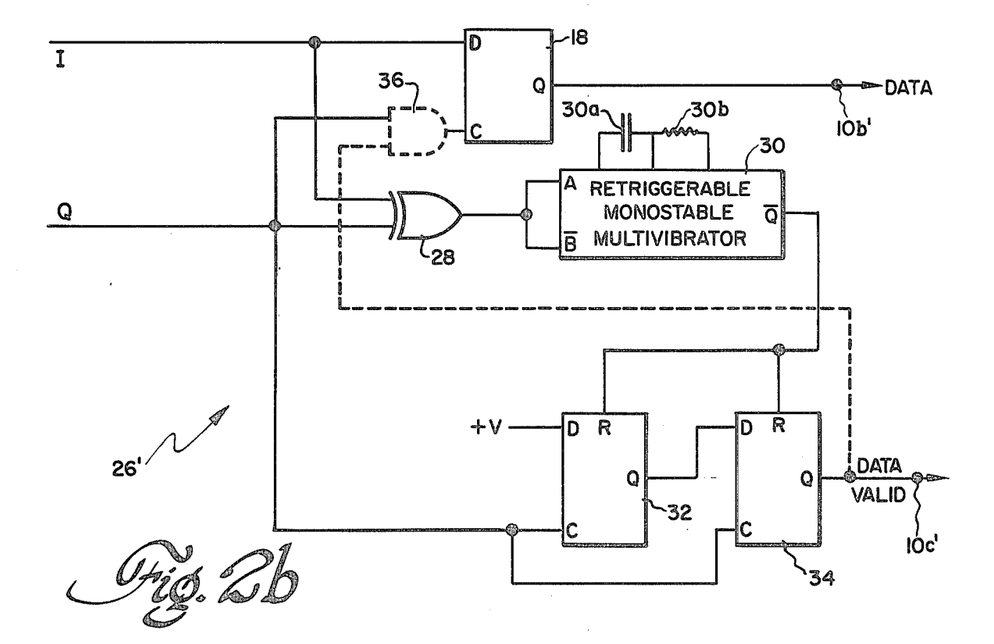
FIG. 2b is a second presently preferred embodiment of the FSK demodulator with "data valid" output.

For those systems where it may be necessary, or desirable, to provide only the last valid bit of data, an AND gate 36 may be utilized in the clock line to flip-flop 18. One input of the two-input AND gate 36 receives the Q signal, while the other input receives the data valid signal at the Q output of flip-flop 34. The output of gate 36 is connected to the clock C input of data flip-flop 18. If subcircuit 26' finds that valid data is present, output 10c' will be at a logic 1 level, gating the Q waveform to the clock C input of the data flip-flop 18, to allow the flip-flop to assume the output state controlled by the I channel signal and provide a new bit of data. If an invalid signal determination is made by subcircuit 26', a logic 0 level is provided at output 10c', preventing the Q channel signal from transmission through gate 36. Thus, the clock C input of data flip-flop 18 is inhibited and its output does not change state, holding the last valid data bit thereat.

Figure 3A:
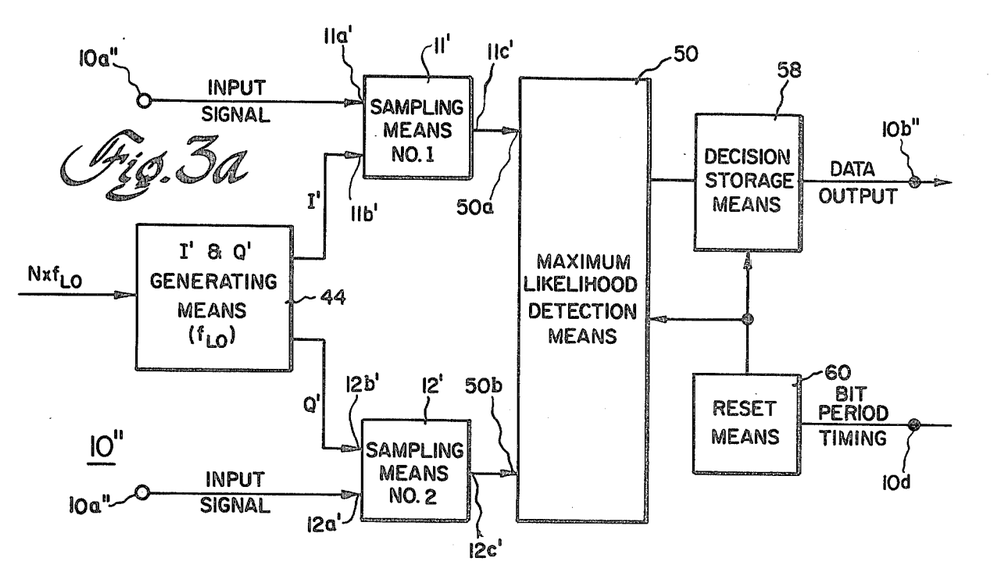
FIGS. 3a and 3b are respectively a block diagram and a schematic diagram of another presently preferred embodiment of a baseband FSK demodulator in accordance with the principles of the present invention.
Figure 3B:
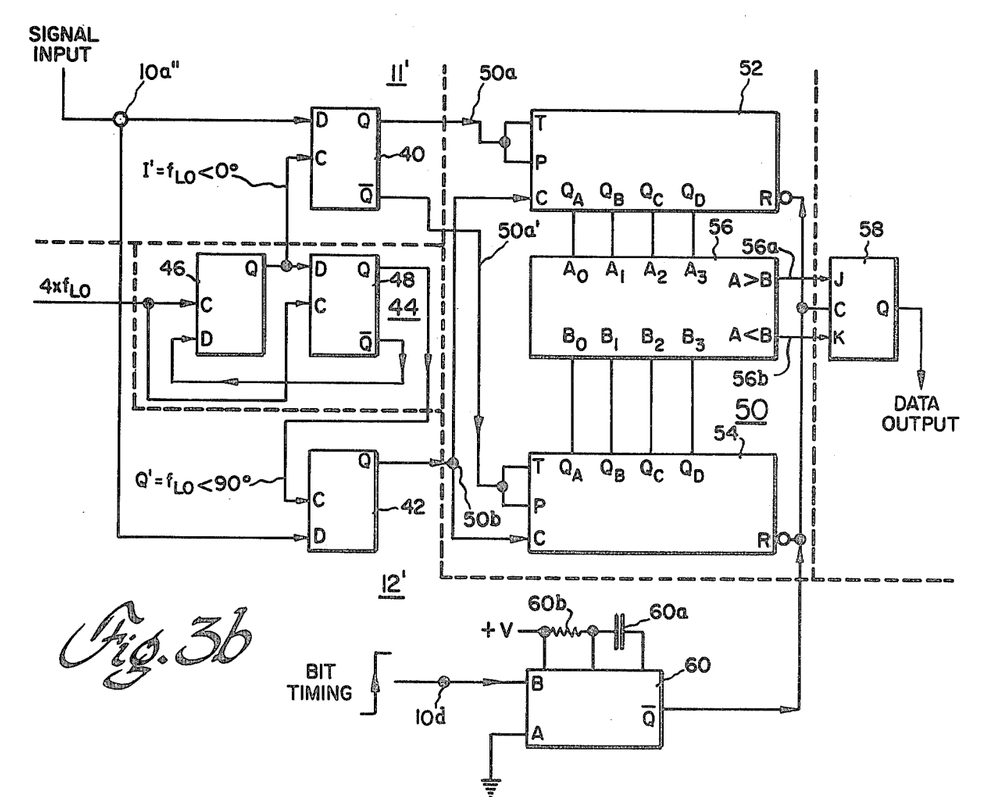

Referring now to FIGS. 3a and 3b, a frequency-shift-keyed binary data signal demodulator 10" operates at baseband (i.e. with a zero intermediate frequency) and is implementable entirely with digital logic, without need for analog multipliers or filters. This demodulator 10' is especially suitable for input FSK signals having tone frequencies spaced at a multiple of the signaling bit rate, i.e. $T=n/D$, where T is the bit time interval, n is an integer and D is the frequency shift from a reference center frequency $f_{LO}$. Demodulator 10" has an FSK input 10a" providing the input signal to a first input 11a' or 12a' of respective first or second sampling means 11' or 12'. In particular, the sampling means are type D flip-flops 40 and 42, each having a data D input connected to signal input 10a". The phase-quadrature local reference frequency signals I' and Q' are applied, from a I' and Q' generating means 44, to the respective local oscillator inputs 11b' and 12b' of the sampling means. In particular, the I' local reference signal, at the local oscillator frequency $f_{LO}$ and an angle of 0°, is applied to the clock C input of sampling means flip-flop 40, while the Q' local reference oscillator signal is applied at the same frequency $f_{LO}$ and an angle of 90°, to the clock C input of the second sampling means flip-flop 42. The I' and Q' reference waveforms are square-waves, displaced by 90° with respect to one another.

The circuit 44 for generating the I' and Q' signals utilizes first and second type D flip-flops 46 and 48, each having a clock C input receiving a square-wave at some multiple N of the local oscillator frequency $f_{LO}$; in the illustrated embodiment N=4. The data D input of flip-flop 46 is connected to the Q output of flip-flop 48. The data D input of flip-flop 48 is connected to the Q output of flip-flop 46, at which the I' signal is provided. The Q' signal is provided at the Q output of flip-flop 48. Thus, two square-waves at the desired local reference frequency (the arithmetic mean of the FSK frequencies) are generated in quadrature with one another.

The sampled input signal at the sampling means outputs 11c' and 12c' are provided to first and second inputs 50a and 50b of a maximum likelihood detection means 50. In the particular circuitry embodiment of FIG. 3b, sampling means output 11c' provides a first input 50a signal from the Q output of flip-flop 40. The logical inverse of that signal, from the $\bar{Q}$ output of flip-flop 40, is provided as an additional first input 50a'. Second input 50b is provided from the Q output of second sampling means flip-flop 42.

The maximum-likelihood detection means 50 uses first and second synchronous M-bit binary counters 52 and 54. Each counter has a clock C input receiving the second input 50b waveform from the Q output of flip-flop 42. For the illustrative embodiment, with M=4, counters 52 and 54 may be similar to the commonly-available 74LS161A synchronous counters. Each counter has a pair of enabling T and P inputs. The T/P inputs of first counter 52 are connected to input 50a, at the Q output of first sampling means flip-flop 40, while the T/P inputs of second counter 54 are connected to auxiliary input 50a' at the $\bar{Q}$ output of flip-flop 40. For the illustrated M=4 case, 4 binary counting stage outputs $Q_A$-$Q_B$ are provided from each of counters 52 and 54. Each of the outputs of each counter is connected to the associated input of an M-stage binary comparator 56. In the illustrated embodiment, wherein M=4 and comparator 56 is a commonly available 74LS85, each of the first signal inputs $A_0$-$A_3$ is respectively connected to an associated one of first counter 52 outputs $Q_A$-$Q_D$, while each of the second signal inputs $B_0$-$B_3$ is respectively connected to an associated one of second counter 54 outputs $Q_A$-$Q_D$. Comparator 56 functions such that if the binary count at inputs A is greater than the binary counts at inputs B, a first (A>B) output 56a is enabled to a logic 1 level, and if the binary counted input B is greater than the binary counted inputs A, a second (A<B) output 56b is enabled to a logic 1 level. The detector outputs are connected to a decision-storage means. Thus, output 56a is connected to the J input of a J-K flip-flop logic means 58, having its K input connected to second output 56b of comparator means 56. The data output 10b" of the circuit is connected to the Q output of flip-flop 58, which forms the decision storage means. Flip-flop 58 may be a commonly-available 74LS112.

A reset means 60 receives bit period T timing information at a circuit input 10d, for providing a reset signal to detection means 50 and storage means 58. Reset means 60 utilizes a monostable multivibrator having a positive-going triggering input B receiving the bit timing waveform at input 10d. Responsive to each positive-going bit timing signal transition, a negative-going reset pulse is provided, to the logic 0 reset R inputs of counters 52 and 54, from the $\bar{Q}$ output of monostable multivibrator 60. The reset pulse duration is established by a timing capacitance 60a and timing resistance 60b associated with the multivibrator. Multivibrator 16 may be a commonly-available 74121 integrated circuit.

Figure 3C:
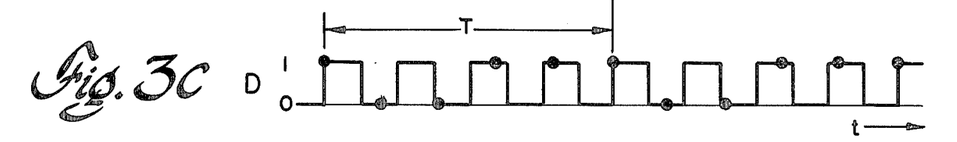
FIGS. 3c–3e and 4a–4c are timing diagrams useful in understanding operation of the demodulator of FIG. 3b.
Figure 3D:
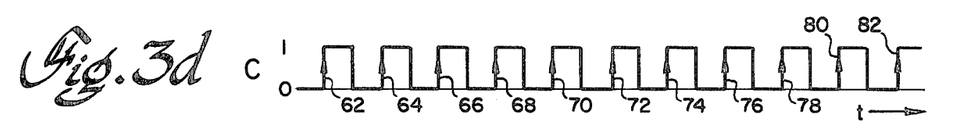
Figure 3E:
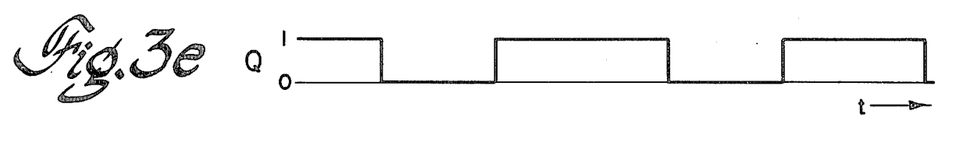

In operation, the first and second sampling means 11' and 12' (flip-flops 40 and 42, respectively) sample the state of the amplitude-limited FSK input binary signal. The sampling times are defined by the low-to-high transitions of the I' and Q' local reference oscillator square-wave logic signals provided by generating means 44. If the input signal is at a high (logic 1) level, the logic 1 level will be stored in the sampling means flip-flop and appear at its Q output; conversely if the input signal is at a low (logic 0) level, the flip-flop Q output will be at a logic 0 level. If the frequency of the input FSK signal is different from the local reference frequency, a square-wave is provided at the sampling means flip-flop Q output. This square-wave has a frequency which is equal to the absolute value of the difference between the FSK and LO frequencies. The sampling means output Q waveform is shown in FIG. 3e, for an FSK input signal at the D input (FIG. 3c) having a frequency less than the local reference frequency of the waveform at the clock C input (FIG. 3d). Thus, at the beginning of the time interval T, a first positive-going transition 62 at the clock input (FIG. 3d) responds to the logic 1 level at the D input to provide a logic 1 Q output. At next positive-going edge 64, the FSK input signal at the D input is at a logic 0 level, changing the Q output signal also to a logic 0 level, which continues responsive to edge 66. At edge 68, the FSK input is again at a logic 1 level, and the Q output similarly switches to a logic 1 level, which is maintained thereafter responsive to edges 70 and 72. At edge 74, a logic 0 input waveform is sampled and the Q output changes to a logic 0 level and remains thereat until edge 78. From edge 78 until edge 82, the Q output is at a logic 1 level, reverting to a logic 0 level at clocking edge 82. It will be seen that there are four FSK input waveform cycles in bit time interval T of the example, with five local reference signal cycles in the same time interval; a Q output frequency of one cycle results.

Figure 4A:
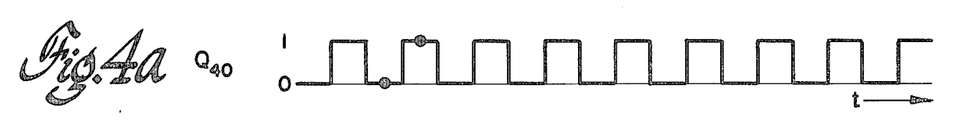
Figure 4B:
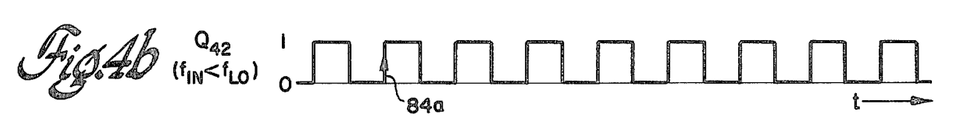
Figure 4C:
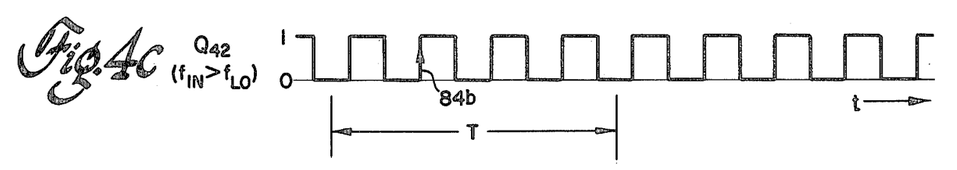

Due to the 90° phase difference between the two local reference signals I' and Q' applied as clock signals, the times at which the Q output of flip-flops 40 and 42 change state are displaced from one another by an amount that corresponds to a 90° phase displacement at the difference frequency. Thus, the two D-type flip-flops 40 and 42 provide a signal processing function equivalent to the two analog mixers, two analog lowpass filters and two analog limiters of embodiments 10 and 10'. The digital operation of first and second sampling means 11' and 12' also follows the rotating vector illustrations of FIGS. 1a and 1b, in that, for an input frequency greater than the local reference frequency, second sampling means output Q waveform will have a low-to-high transition while the Q output of flip-flop 40 is high, and will have a low-to-high transition while the Q output of flip-flop 40 is high for input frequencies less than the local reference frequency. This is shown in FIGS. 4a-4c, wherein the FSK input signal has a frequency shift, i.e. the difference between the two bit tone frequencies, which is n=8 times the bit rate. Thus, there are M half-cycles of the square-wave signal $Q_{40}$ at the output of flip-flop 40, which signals have transitions substantially midway through each of the square-wave half-cycle of the second flip-flop $Q_{42}$ waveforms in FIGS. 4b and 4c (due to the 90° phase quadrature difference). The low-to-high transition 84a of the $Q_{42}$ signal will be seen to occur when the $Q_{40}$ output is at a logic 0 level if the input frequency is less than the local reference frequency (FIG. 4b), and to occur when the $Q_{40}$ signal is at a logic 1 level if the input frequency is greater than the local reference frequency (FIG. 4c).

In operation, the maximum likelihood detection means 50 counts, in the counter 52, the number of times during a bit time interval that the flip-flop 40 output Q signal is at a logic 1 level, and counts, in counter 54, the number of times that output is at a logic 0 level, when the flip-flop 42 Q output transitions from a low logic level to a high logic level. This is accomplished by utilizing the Q output of flip-flop 42 to control the T/P inputs of first counter 52 and using the inverse thereof, at the $\overline{Q}$ output, to control the T/P inputs of second counter 54. The two binary counts stored in the respective counters 52 and 54 are compared in binary comparator 56, which decides whether the input frequency is greater than or less than the local oscillator frequency, dependent upon whether the count in counter 52 is respectively greater than or less than the count in counter 54. The result of this decision is stored in the J-K flip-flop 58 responsive to the high-to-low transition of an end-of-bit period pulse generated by multivibrator 60, response to the externally supplied bit timing waveform. Simultaneously with storage of the binary bit decision level, in storage means 58, the same pulse that is applied to the storage means clock C input is applied to the reset R inputs of the counters to reset the counter to a zero count and enable the decision means for the next bit time interval. It should be understood that the number of measurements made in each bit interval could be doubled by implementing a counting function of the high-to-low transitions of the Q output of second sampling means flip-flop 42, in addition to the described sampling on the low-to-high transition thereof.

While several presently preferred embodiments of my novel demodulator for binary frequency-shift-keyed data signals have been described in detail herein, many modifications will now become apparent to those skilled in the art. It is my intent to be limited only by the scope of the appending claims, and not by the specific details and instrumentalities presented by way of description of the preferred embodiments herein.

What is claimed is:

1. A demodulator for recovering binary data bits from first and second frequencies of a frequency-shift-keyed signal, comprising:
 means for generating first and second signals in phase quadrature at a local reference frequency between said first and second frequencies;
 first and second means, each receiving a different one of the phase-quadrature local reference signals, for converting the frequency-shift-keyed signal to respective first and second baseband signals;
 means for limiting the amplitude and frequency components of the respective first and second baseband signals to provide respective I and Q signals;
 means for storing one of said I and Q signals responsive to a transition in the remaining one of said I and Q signals and for providing the stored signal directly as a recovered binary data bit; and
 means receiving the I and Q signals for providing an output signal indicative of the validity of the signal then in said storing means as a validly-recovered binary data bit.

2. The demodulator of claim 1, wherein said local reference frequency is substantially equal to the arithmetic mean of the first and second frequencies.

3. The demodulator of claim 2, wherein said limiting means includes means for lowpass filtering each of said first and second baseband signals.

4. The demodulator of claim 3, wherein each of said lowpass filtering means has a cutoff frequency greater than the difference frequency between said local reference signal frequency and either one of said first and second frequencies.

5. A demodulator for recovering binary data bits from first and second frequencies of a frequency-shift-keyed signal, comprising:
 means for generating first and second signals in phase quadrature at a local reference frequency between said first and second frequencies;
 first and second means, each receiving a different one of the phase-quadrature local reference signals, for converting the frequency-shift-keyed signal to respective first and second baseband signals;
 means for limiting the amplitude and frequency components of the respective first and second baseband signals to provide respective I and Q signals;
 means for storing one of said I and Q signals responsive to a transition in the remaining one of said I and Q signals; and means receiving the I and Q signals for providing an output signal indicative of the validity of the signal then in said storing means as a recovered binary data bit, and comprising: an exclusive OR gate having a first input receiving the I signal, a second input receiving the Q signal, and an output; and a retriggerable monostable multivibrator having an input coupled to the gate output and a valid-data output providing said output signal as a pulse of a predetermined duration responsive to each transition of the gate output.

6. The demodulator of claim 5, wherein the multivibrator pulse output duration is not less than the duration of a bit of binary data.

7. The demodulator of claim 6, wherein said validity means further comprises first and second flip-flop logic elements, each having a clock input receiving the Q signal, a reset input receiving the output of the multivibrator, a data input and an output; the first flip-flop data input receiving a first binary level and the second flip-flop data input coupled to the output of the first flip-flop; said second flip-flop output providing a non-pulsating valid-data output signal.

8. The demodulator of claim 7, further comprising means coupled to said storing means for causing the last valid data bit received to be stored therein until a next subsequent valid data bit is received.

9. The demodulator of claim 8, wherein said causing means includes an AND gate having a first input receiving the Q signal, a second input receiving the valid-data signal at the output of said second flip-flop, and an output coupled to the clock input of said storing means.

10. The demodulator of claim 5, wherein said local reference frequency is substantially equal to the arithmetic mean of the first and second frequencies.

11. The demodulator of claim 10, wherein said limiting means includes means for lowpass filtering each of said first and second baseband signals.

12. The demodulator of claim 11, wherein each of said lowpass filtering means has a cutoff frequency greater than the difference frequency between said local reference signal frequency and either one of said first and second frequencies.

13. A demodulator for recovering binary data from a frequency-shift-keyed signal having first and second frequencies separated by a multiple of the data bit rate, comprising:
means for generating first and second signals in phase quadrature at a local reference frequency between said first and second frequencies;
first and second means, each receiving a different one of the phase-quadrature local reference frequency signals, for sampling the frequency-shift-keyed signal to provide respective first and second sampled baseband signals;
means receiving said first and second sampled baseband signals for detecting with maximum likelihood the binary data bit then being received; and
means for storing the decisional result of the detecting means as the recovered binary data bit.

14. The demodulator of claim 13, further comprising means for resetting the decision storing means and the maximum likelihood detecting means at the beginning of each of a succession of bit timing intervals.

15. The demodulator of claim 14, wherein said resetting means is a monostable multivibrator providing a resetting pulse responsive to a predetermined edge of a bit timing waveform.

16. The demodulator of claim 13, wherein said generating means receives an input frequency at an integer multiple N of the desired local reference frequency.

17. The demodulator of claim 16, wherein said integer multiple N=4, and said generating means comprises first and second flip-flop logic elements each having a clock input receiving the waveform at said multiple N of said local reference frequency, a data input, and at least a Q output; the second flip-flop also having a $\overline{Q}$ output, connected to the data input of the first flip-flop; the Q output of the first flip-flop being connected to the data input of the second flip-flop; said first and second signals being provided at the respective Q outputs of said first and second flip-flops.

18. The demodulator of claim 13, wherein each of said first and second sampling means comprises a flip-flop logic element having a clock input receiving a different one of said first and second local reference frequency signals, a data input receiving the frequency-shift-keyed signal, and an output having a binary logic state determined by the state of the frequency-shift-keyed signal present at its data input when the local reference frequency signal at its clock input transitions in at least one predetermined direction.

19. A demodulator for recovering binary data from a frequency-shift keyed signal having first and second frequencies separated by a multiple of the data bit rate, comprising:
means for generating first and second signals in phase quadrature at a local reference frequency between said first and second frequencies;
first and second means, each receiving a different one of the phase-quadrature local reference frequency signals, for sampling the frequency-shift-keyed signal to provide respective first and second sampled signals;
means receiving said first and second sampled signals for detecting with maximum likelihood the binary data bit then being received, and comprising: first and second binary counters, each having a clock input enabled by the output of the second sampling means, a data input receiving the output of said first sampling means, and a plurality of binary counting stage outputs; and a digital comparator having a first plurality of inputs each individually connected to an associated one of the stage outputs of a first one of said counting means and a second plurality of inputs each individually connected to an associated one of the stage outputs of the other counting means, and having first and second outputs respectively enabled if the count in the first one of said counting means is respectively less than and greater than the count in the other counting means; and
means for storing the decisional result of the detecting means as the recovered binary data bit.

20. The demodulator of claim 19, wherein said decision storage means is a flip-flop logic element having a clock input activated at the end of each data bit time interval and having inputs receiving the less than and greater than outputs of said comparator means, and an output having a binary data state thereat controlled responsive to the state of the comparator outputs at the end of each bit time interval.

21. The demodulator of claim 19, further comprising means for resetting the decision storing means and the maximum likelihood detecting means at the beginning of each of a succession of bit timing intervals.

22. The demodulator of claim 21, wherein said resetting means is a monostable multivibrator providing a resetting pulse responsive to a predetermined edge of a bit timing waveform.

23. The demodulator of claim 19, wherein said generating means receives an input frequency at an integer multiple N of the desired local reference frequency.

24. The demodulator of claim 23, wherein said integer multiple N=4, and said generating means comprises first and second flip-flop logic elements each having a clock input receiving the waveform at said multiple N of said local reference frequency, a data input, and at least a Q output; the second flip-flop also having a $\overline{Q}$ output, connected to the data input of the first flip-flop; the Q output of the first flip-flop being connected to the data input of the second flip-flop; said first and second signals being provided at the respective Q outputs of said first and second flip-flops.

25. The demodulator of claim 19, wherein each of said first and second sampling means comprises a flip-flop logic element having a clock input receiving a different one of said first and second local reference frequency signals, a data input receiving the frequency-shift-keyed signal, and an output having a binary logic state determined by the state of the frequency-shift-keyed signal present at its data input when the local reference frequency signal at its clock input transitions in at least one predetermined direction.

* * * * *